UNITED STATES PATENT OFFICE.

LOUIS PAECHTNER, OF CHEAPSIDE, LONDON, ENGLAND.

PROCESS OF MANUFACTURING SIZE.

987,595. Specification of Letters Patent. Patented Mar. 21, 1911.

No Drawing. Application filed September 15, 1906. Serial No. 334,770.

*To all whom it may concern:*

Be it known that I, LOUIS PAECHTNER, a subject of the King of Great Britain, residing at 40 Queen street, Cheapside, in the county of London, England, manufacturers' agent, have invented a certain new and useful Process of Manufacturing Size, of which the following is a specification:

The present invention relates to a process of manufacturing size for the sizing of yarns and other textile fabrics. It is known that such size can be manufactured by using as a basis flour, farina, sago or similar material which has been chemically changed by boiling with water preferably in presence of small quantities of acids or alkalis. Other methods of preparing this basis have also been described as for instance by treating a paste made by the action of boiling water in potato flour with chlorid of lime solution. The basis material prepared with the aid of acids or alkalis as above described, is mixed before application with tallow, wax, sizing grease, glycerin, soap, gums, china-clay, chalk, metallic salts or other lubricating, filling or weighting substances. In the method of preparing the aforesaid basis material by the action of acids or alkalis as above described, the finished basis material has to be very carefully neutralized before it can be used.

I have discovered that difficulties in the manufacture may be avoided and a more generally useful product obtained by replacing the acid or alkali or the chlorid of lime used in the preparation of the basis material by a solution of sodium or potassium hypochlorite; and that the presence of a lime starch compound is not necessary. Further, since the active agent in the hypochlorite used is the chlorin which it contains and which is easily liberated therefrom, a solution of chlorin in water may be conveniently used as replacing the hypochlorite solution. Considerable economy of manufacture is effected by the use of my improved method of manufacture.

The following examples show how my invention may be applied but it is to be understood that I do not confine myself to these methods of applying the invention.

Example I: A mixture of 240 gallons of water with 160 lbs. of potato flour is heated to boiling in any convenient manner, the mixture being kept well stirred throughout this and the subsequent processes. About 2.5 gallons of a 1% solution of chlorin and water is then added with the result that the liquid paste becomes thinner and more mobile. The mixture is then boiled in any convenient way for a short time in order to dispel or destroy the excess of chlorin. After the product has been carefully neutralized by addition of a sufficient quantity of an alkali it is ready for use.

Example II: A mixture of 240 gallons of water and 160 lbs. of flour is heated to boiling with constantly stirring by any convenient means. To it is then added with stirring about one and three quarter pints of sodium hypochlorite solution of about 41° Twaddell in 4 to 5 gallons of water. After boiling for a short time to destroy or dispel the free chlorin or hypochlorite the solution is ready for use. In this example the sodium hypochlorite may be replaced by postassium hypochlorite. The proportions by weight in this example are about 50 parts of water, about 4 parts of flour and about one part of the watery solution of sodium hypochlorite.

The proportion of chlorin solution or of the hypochlorite solution may be varied to suit the exigencies of any particular case. Further, the flour or potato flour may be replaced by any suitable substance such as sago-flour, starch or the like.

What I claim and desire to secure by Letters Patent of the United States is:—

1. The herein-described process for the manufacture of a size for yarns consisting in mixing 160 lbs. of flour with 240 gallons of water to form a paste, heating the paste to boiling, adding to the mixture about one and three quarter pints of metallic alkali hypochlorite solution at about 41° Twaddell in water, and boiling the mixture to expel the free chlorin.

2. The herein-described process for the manufacture of a size for yarns consisting in mixing 50 parts by weight of water with 4 parts of flour to form a paste, heating the paste to boiling, adding to the mixture 1 part of a watery solution of metallic alkali hypochlorite, and boiling the mixture to expel the free chlorin.

In testimony whereof I affix my signature in presence of two witnesses.

LOUIS PAECHTNER.

Witnesses:
T. SELBY WARDLE,
T. J. OSMAN.

Copies of this patent may be obtained for five cents each, by addressing the "Commissioner of Patents, Washington, D. C."